United States Patent [19]

Weber

[11] Patent Number: 4,800,993

[45] Date of Patent: Jan. 31, 1989

[54] TANDEM PARKING BRAKE CALIPER FOR DISC BRAKES

[75] Inventor: James L. Weber, West Bloomfield, Mich.

[73] Assignee: ITT Corporation, New York, N.Y.

[21] Appl. No.: 67,069

[22] Filed: Jun. 29, 1987

[51] Int. Cl.$^4$ .................. F16D 55/18; F16D 55/26; F16D 65/14

[52] U.S. Cl. .................. 188/72.6; 188/72.3; 188/72.4; 188/72.9; 188/73.31; 188/71.8; 188/71.9; 188/106 F; 188/106 P; 188/73.44; 188/73.45; 188/196 BA

[58] Field of Search .................. 188/72.9, 70 R, 70 B, 188/71.9, 71.8, 72.4–72.8, 106 F, 106 P, 106 R, 196 BA, 79.5 K, 71.5, 71.1, 73.43, 73.44, 73.45, 73.46, 73.47, 73.31, 73.35–73.38, 72.1, 73.42, 73.39, 72.3

[56] References Cited

U.S. PATENT DOCUMENTS

| | | | |
|---|---|---|---|
| 3,507,367 | 4/1970 | Brown et al. | 188/106 F |
| 3,613,837 | 10/1971 | Tsubouchi | 188/72.9 |
| 3,835,961 | 9/1974 | Troester et al. | 188/106 F X |
| 3,848,704 | 11/1974 | Falk | 188/106 F X |
| 3,899,051 | 8/1975 | Grosseau | 188/106 F X |
| 3,907,074 | 9/1975 | Rist | 188/72.9 |
| 3,942,611 | 3/1976 | Burnett | 188/73.44 X |
| 4,042,073 | 8/1977 | Dickenson | 188/72.9 |
| 4,064,973 | 12/1977 | Deem et al. | 188/71.9 X |
| 4,089,393 | 5/1978 | Falk | 188/73.39 X |
| 4,117,910 | 10/1978 | Johannesen | 188/196 BA X |
| 4,154,321 | 5/1979 | Falk | 188/72.9 X |
| 4,274,513 | 6/1981 | Kasselmann | 188/196 BA X |
| 4,331,221 | 5/1982 | Evans et al. | 188/73.44 |
| 4,374,552 | 2/1983 | Dayen | 188/72.9 |
| 4,454,933 | 6/1984 | Hunnicutt et al. | 188/72.7 X |
| 4,540,066 | 9/1985 | Evans | 188/71.9 |
| 4,544,045 | 10/1985 | Runkle | 188/72.9 X |
| 4,598,801 | 7/1986 | Villata | 188/196 BA X |
| 4,643,278 | 2/1987 | Thiel et al. | 188/72.7 |
| 4,650,039 | 3/1987 | Weiler et al. | 188/73.44 |
| 4,719,997 | 1/1988 | Tsuruta | 188/106 F X |

FOREIGN PATENT DOCUMENTS 2618966 11/1977 Fed. Rep. of Germany ..... 188/72.7

Primary Examiner—Douglas C. Butler
Attorney, Agent, or Firm—James B. Raden

[57] ABSTRACT

A tandem parking brake caliper system for use with the rotor of a disc brake of a wheel of an automotive vehicle. The system includes a caliper adapted to be slidably mounted in a boss of an anchor extension mounted to a non-rotating portion of the vehicle. The caliper surrounds a radially outer peripheral portion of the rotor on opposite sides thereof. Frictional brake linings are mounted on the caliper surfaces which face the rotor. A movable piston is mounted in a bore of the caliper for engaging one of the linings for forcing the linings into engagement with the rotor upon the application of force onto the piston and the resulting translation of the caliper. An actuating lever is rotatably mounted to the assembly and includes a cam surface for engaging and applying translating force to a cam follower surface of the piston. The lever is connected to a cable actuating the lever.

12 Claims, 2 Drawing Sheets

TANDEM PARKING BRAKE CALIPER FOR DISC BRAKES

BACKGROUND OF THE INVENTION

This invention relates to tandem parking brake calipers for disc brakes. Moreover, this invention relates to suck a parking brake caliper which is added to, but which functions separately and independently of, the existing service brake of the vehicle wheel.

Parking brakes for automobiles are well known and have been widely used in the art. The continuous development of the automotive industry has made it essential that the development of hydraulic brakes embark upon new courses. Accordingly, modern vehicles now incorporate disc brakes on at least one pair of the vehicle wheels. These disc brake systems incorporate a generally circular disc-like member called a rotor which presents parallel outer surfaces. The parallel surfaces engage friction linings of the service brake caliper which, in turn, surrounds the circumferentially outer peripheral portion of the rotor. The service brake provides dynamic stopping of the vehicle during normal vehicle operation. The service brake is applied by a brake pedal or a pedal-actuated booster piston. In both cases, the vehicle operator initiates the action to force the friction linings within the caliper against the disc rotor. When the operator is out of the vehicle and the vehicle is parked, such as, for example, on a hill, means must be applied to hold the vehicle stationary without the continued assistance of an operator. Thus, in the prior art, parking brakes have been provided. In more recent systems, these parking brakes have taken one of two forms. In the first, a so-called drum-in-hat brake is provided in which the service disc brake incorporates a small drum brake assembly inside of the cylindrical portion of the existing rotor. This small drum brake is used for parking purposes only and is actuated by a cable. The second prior art parking brake device for modern disc brake systems is referred to as an integral adjusting caliper which incorporates a mechanical actuator and an adjuster inside of the service caliper bore. Both of these known systems exhibit significant problems as will be appreciated by those skilled in the art.

For example, the drum-in-hat parking brakes have the disadvantage that a complete second drum brake assembly must be provided in addition to the service caliper brake. Further, these parking brakes are susceptible to corrosion problems. Still further, to service the drum-in-hat parking brake, it is ordinarily necessary to remove the rotor and the caliper from the wheel as well as the various drum brake components. It also has been found that it is difficult to mount these parking brakes in the wheel-end environments of many modern-day vehicles.

The integral adjusting power brakes have disadvantages in that they require costly gears and bearings and in that their overall performance is limited because the brake holding function relies upon the frictional values of the linings of the service brake. That is, parking brakes typically are not power-assisted by means of a booster and rely, instead, upon a hand-operated parking brake cable and lever. Thus, the relatively low friction values of the service brake linings, while suitable for dynamic, power-assisted braking, has not been sufficient to provide the same brake-holding power in parking brake applications. Further, a failure of the integral adjusting devices may also disadvantageously result in a failure of the entire service brake as well. This is a problem. Still further, the integral adjusting parking brake has been found to be too complicated to service in the field.

These and other disadvantages are overcome by the present invention wherein a tandem parking brake caliper is provided wherein no "automatic adjustment" is needed and only a minimum number of low-cost additional components are required. Further, the caliper utilizes unique maximum friction linings which are provided at a larger effective radius near the outside diameter of the rotor. The device is easy to service as a minimum number of parts are utilized and the overall packaging can be provided at any one of a number of convenient locations about the wheel. Further, the linings of the tandem parking caliper, in accordance with the teachings of the present invention, should never wear out unless, of course, the parking caliper is repeatedly utilized as an emergency brake in the event of failure of the service brake. That is, the unique high friction linings normally engage the rotor in a fixed static manner and therefore are not subjected to wear. Further, the tandem parking caliper in accordance with the present invention advantageously remains fully functional in the event of failure of the existing service caliper; and thus truly provides an emergency brake.

SUMMARY OF THE INVENTION

Briefly, the present invention provides a tandem parking brake caliper system for use with the rotor of a disc brake of a wheel of an automotive vehicle. The system includes a caliper adapted to be mounted to a non-rotating portion of the vehicle. The caliper surrounds a radially outer peripheral portion of the rotor on opposite sides thereof. A frictional brake lining is mounted on at least one of the caliper surfaces which faces the rotor. A movable piston is mounted in a bore of the caliper for engaging the lining for forcing the lining into engagement with the rotor upon the application of force onto the piston. An actuating lever is rotatably mounted to the assembly for engaging and applying translating force to the piston. Means are provided for actuating the lever.

BRIEF DESCRIPTION OF THE DRAWING

The advantages of this invention will become more readily appreciated as the same becomes completely understood by reference to the following detailed description when taken in conjunction with the accompanying drawing wherein.

DETAILED DESCRIPTION

Figure 1A:
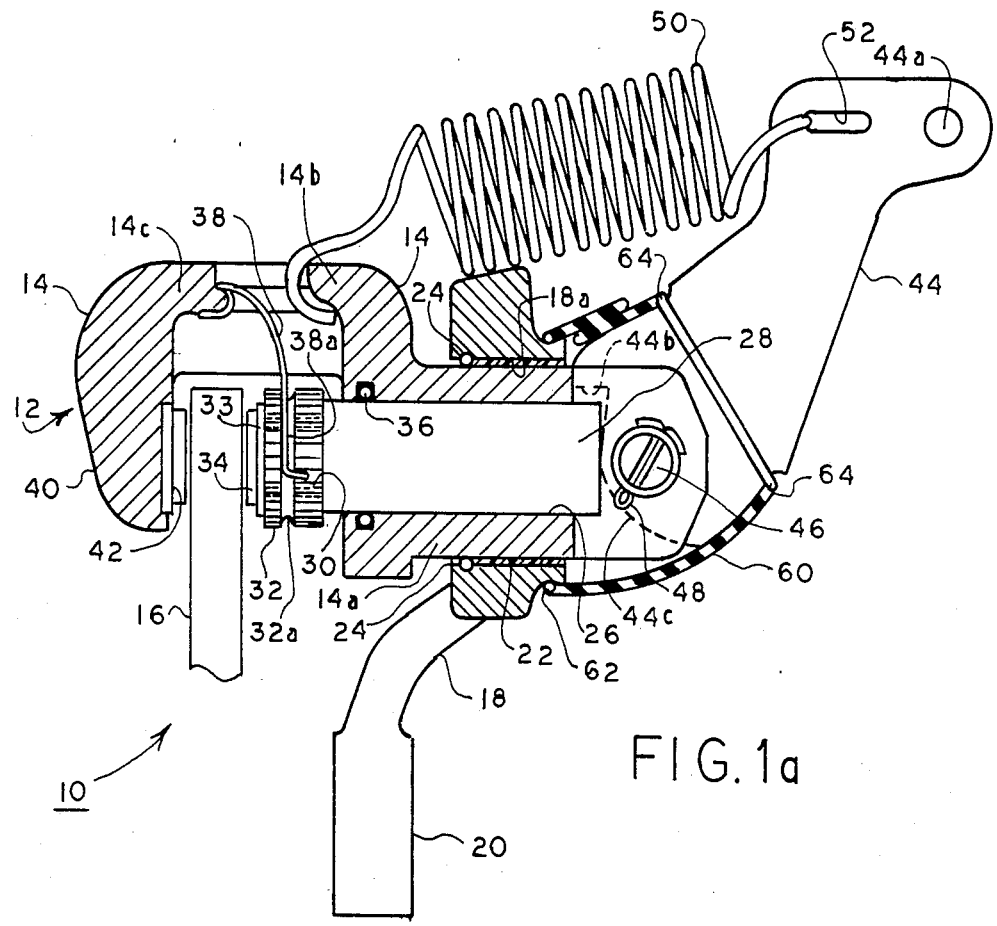
FIG. 1a is a side view, in partial cross section, of the tandem parking caliper system in accordance with the principles of the present invention.

Referring now to FIG. 1, there is shown generally at 10 a side view of the tandem parking brake caliper system 10 in accordance with the present invention.

System 10 includes a tandem parking caliper shown generally at 12 including a caliper body 14 which surrounds the generally parallel surfaces of a rotor member 16 attached to a conventional disc brake system of an automotive wheel. Caliper 14 is attached to the conventional brake system by means of an anchor extension 18 of the existing service brake anchor 20 and which is preferably provided as an integral extension thereof. Extension 18 of service brake anchor 20 includes a boss having a suitable opening 18a which is provided with a bushing means 22 made of synthetic resin polymeric material for slidably receiving an extension 14a of caliper 14. Extension 18 of service brake anchor 20 is best illustrated in FIG. 2. An O-ring seal 24 is provided in a groove 24a in the wall of the circular opening 18a of anchor extension 18 as illustrated in FIG. 1. O-ring seal 24 may take the form of any given sealing apparatus such as an annular or a circular bearing or a conventional O-ring.

Caliper 14 includes a generally cylindrical bore 26 which extends through extension 14a and which receives a piston 28. The forward end of piston 28 includes a threaded portion 30 which threadedly engages a star wheel 32. Star wheel 32 includes a recessed end bore which accepts a shoe 33 and which, in turn, mounts a round, button-shaped frictional brake lining 34 for engaging one of the parallel surfaces of rotor 16. Brake lining 34 preferably comprises a maximum friction material which may have a friction coefficient ($\mu$) on the order of 45. Brake lining 34 is advantageously mounted at outer diameter peripheral portion of rotor 16 to maximize the parking braking forces. Piston 28 is sealingly engaged within bore 26 by means of a suitable sealing device such as an O-ring 36 in a groove of bore 26. Star wheel 32 is resiliently urged away from the facing surface of rotor 16 by means of a piston return spring 38 which resiliently urges piston 28 away from the parallel surface of rotor 16.

Advantageously, piston 28 can be provided as a single piece of round bar stock with one end threaded and the other end a cam follower. It will also be appreciated by those skilled i the art that piston return spring 38 also functions as an anti-rotation device for star wheel 32, as will be explained more fully hereinafter.

The outer end of caliper 14 includes an encircling leg portion 40 which includes an outer brake lining 42 which is adapted to engage the outer side of rotor 16. Brake lining 42 preferably comprises a high or maximum friction material which is also mounted in a recess of the outer side caliper leg by means of a mounting shoe. An actuating lever 44 is pivotally mounted at an outwardly end of caliper 14 by means of a pin 46 which is constrained within a slotted end portion of extension 14a of caliper 14 and retained by means of a conventional cotter pin 48. Lever 44 includes a cable mounting hole 44a as described more fully hereinafter. Lever 44 further includes a return stop 44b and a piston engaging cam surface 44c. A lever return spring 50, which is hooked around an extension 14b of caliper 14 and which is further hooked at its other end to a slot 52 of a parking brake lever 44, keeps lever 44 and its return stop 44b bottomed on extension 14a of caliper 14.

Figure 1B:
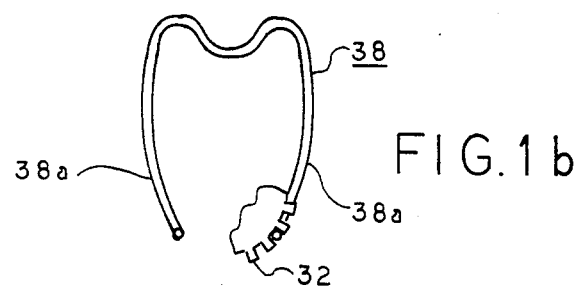
FIG. 1b is an end view of the piston return spring and star wheel fastener of FIG. 1a of the tandem parking brake caliper piston.
Figure 2:
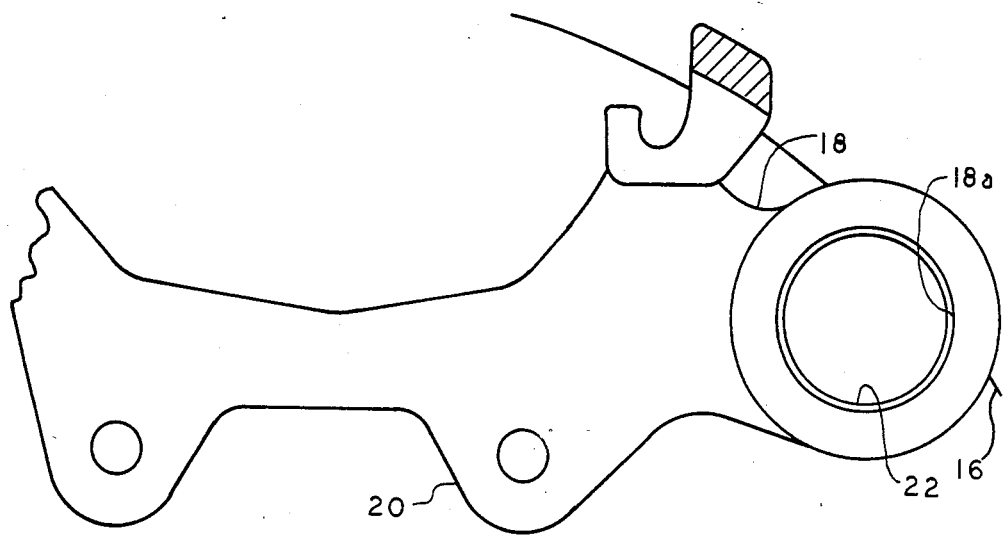
FIG. 2 is a plan view of a preferred mounting arrangement of the device of FIG. 1 as shown in conjunction with a conventional service brake anchor; and, FIG. 3 is a plan view similar to FIG. 2 which further illustrates the assembly of the parking brake caliper system in accordance with the present invention.

As best illustrated in FIG. 1a, piston 28 is urged away from the inner surface of rotor 16 by means of return spring 38 which engages an inward portion 14c of the outer portion of caliper 14. As illustrated in FIG. 1b, spring 38 includes leg portions 38a which engage a suitable circumferentially slot or groove 32a of star wheel 32. The ends of leg portions are bent so as to engage axial slots of star wheel 32 thereby to provide an anti-rotational device to limit the rotation of star wheel 32.

Referring again to FIG. 1a a boot arrangement 60 is provided for protecting the pivotal connection of lever 44 and the outer end of extension 14a of caliper 14 so as to protect same from the undesirable effects of dirt, grease and corrosion. The boot 60 is held in position by suitable snap-on rings 62 and 64 as is well known in the art.

Referring now to FIG. 2 there is shown a plan view of the preferred mounting anchor of the device of FIG. 1. It can be seen that teflon bushing 22 is provided in the boss at the end portion of extension 18 of the existing service anchor 20.

Figure 3:
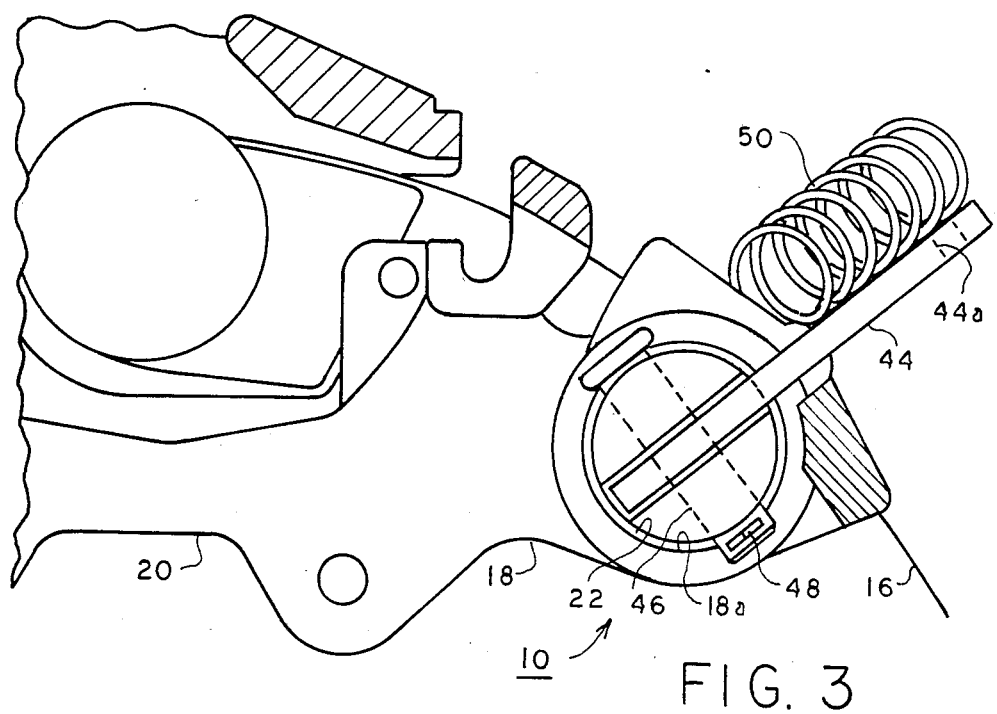

Referring now to FIG. 3 there is shown a plan view similar to the view of FIG. 2 which further illustrates the assembly of the tandem parking brake caliper system 10 in accordance with the present invention. A brake actuating pull cable (not shown) is attached to lever 44 at hole 44a by means of a pin and the clevis end of the cable (not shown). The cable pull direction is best illustrated by arrow labeled CP wherein the force applied in the direction of arrow CP causes the frictional pads of the tandem parking brake caliper to tightly engage against rotor 16.

The operation of the device illustrated in the previous drawing figures is described as follows: Upon actuation of a suitable parking brake cable force in the direction represented by the arrow CP of FIG. 3, the cam surface of lever 44 is rotated into further engagement with the outer end surface of the generally cylindrical piston 28 of FIG. 1. The frictional lining 34 attached to piston 28 thereby engages the inner surface of rotor 16 of the existing service brake system. Once the distance between the lining and the rotor is overcome, continued force against the initially engaged side of rotor 16 causes translation of caliper 14 in the direction toward lever 44. Accordingly, the initial opening between the outer friction lining 42 of caliper 14 and rotor 16 then closes and lining 42 engages the opposite or outer surface of rotor 16 so that both friction linings of the tandem brake caliper engage and hold rotor 16 in the parking-brake-applied position of tandem caliper system 10.

What has been taught, then, is a tandem parking brake caliper system facilitating, notably, a tandem parking caliper device which is inexpensive to manufacture and easy to mount and which overcomes the disadvantages of the prior art. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A tandem parking brake caliper system for use with the rotor of a disc brake of a wheel of an automotive vehicle and for mounting adjacent to the main service brake of said vehicle, said system comprising, in combination:

a caliper for fixed mounting to a non-rotating portion of said vehicle, said caliper surrounding a radially outer peripheral portion of said rotor on opposite sides thereof said caliper including an integral caliper extension mounted within an anchor or extension portion of said adjacent main service brake;

a frictional brake lining material mounted adjacent to at least one of the caliper surfaces facing said rotor;

a movable piston slidably mounted in a bore of said caliper extension of said caliper for forcing said lining into engagement with said rotor upon the application of force into engagement with said rotor upon the application of force onto and translation of said piston;

an actuating lever adapted to be movably mounted to said vehicle in an axial direction of said piston for engaging and applying translating force to said piston; and means for applying force to and actuating said lever.

2. The system according to claim 1, wherein said caliper is mounted about the planar center-line of said rotor for movement of said caliper toward and away from the opposite surfaces of said rotor.

3. The system according to claim 1 wherein said caliper extension of said system is slidably mounted within a bushing of said extension portion of said adjacent main service brake.

4. The system according to claim 1, wherein said caliper includes first and second frictional brake linings mounted on each of the rotor-facing surfaces of said caliper.

5. The system according to claim 1, wherein said piston includes a threaded portion at the end thereof facing said rotor which threadedly engages a star wheel surrounding said threaded portion.

6. The system according to claim 5, wherein said threaded portion is yieldably urged away from said rotor.

7. The system according to claim 6 including spring means coupled between said lever and said caliper for yieldably urging said lever toward said caliper.

8. The system according to claim 7, wherein said lever is pivotally mounted to the end portion of said caliper adjacent the outer end of said piston and wherein the piston engaging portion of said lever includes a cam surface wherein said piston is translated toward said rotor in response to pivoting of said lever.

9. The system according to claim 8, wherein said lever includes a return stop member projecting away from said lever toward said end portion of said caliper to limit the return pivotal movement of said lever in the brake release position.

10. The system according to claim 6, wherein said piston is generally cylindrical and is provided with a cam follower surface at its other end thereof and where said piston is yieldably urged away from said rotor by means of a piston return spring with one end of said spring engaging and received in an annular groove of said star wheel and said one end of said spring including anti-rotation means for limiting the rotation of said star wheel.

11. The system according to claim 1 wherein said system is mounted to an anchor portion of said disc brake of said wheel by means of a boss portion extending away from said anchor and slidably receiving a body portion of said caliper.

12. The system according to claim 1 wherein said caliper includes an extension which is slidably received in an attachment member which is fixedly mounted to said non-rotating portion of said wheel.

* * * * *